United States Patent [19]

Schweitzer et al.

[11] 3,856,472

[45] Dec. 24, 1974

[54] APPARATUS FOR THE GETTERING OF SEMICONDUCTORS

[75] Inventors: Samuel Schweitzer, Birr; Georg Ziffermayer, Wittingen, both of Switzerland

[73] Assignee: Brown Boveri & Company Limited, Baden, Switzerland

[22] Filed: Dec. 19, 1972

[21] Appl. No.: 316,520

[30] Foreign Application Priority Data
Dec. 20, 1971 Switzerland.................... 18431/71

[52] U.S. Cl................... 23/252, 316/25, 148/1.5, 148/188, 211/49 R, 211/49 S, 23/293 R, 23/273 SP, 23/300

[51] Int. Cl..................... H01k 9/00, H01j 7/18

[58] Field of Search........ 211/49 R, 49 S; 124/47 R; 148/188, 191, 1.5; 23/293 R, 293 A, 300, 301 SP, 295, 273 R, 273 SP, 252 R; 316/25

[56] References Cited
UNITED STATES PATENTS

| | | | |
|---|---|---|---|
| 1,127,319 | 2/1915 | Thompson | 211/49 R |
| 2,187,355 | 1/1940 | MacManus | 211/49 S |
| 2,953,438 | 9/1960 | Dale | 23/293 R |
| 3,007,816 | 11/1961 | McNamara | 148/191 |
| 3,128,213 | 4/1964 | Gault | 148/188 |
| 3,354,008 | 11/1967 | Brixey | 148/188 |
| 3,429,818 | 2/1969 | Benedetto | 23/301 SP |
| 3,546,032 | 12/1970 | Basart | 23/273 SP |

FOREIGN PATENTS OR APPLICATIONS 1,816,083   6/1970   Germany.................... 23/301 SP

*Primary Examiner*—Wilbur L. Bascomb, Jr.
*Assistant Examiner*—S. J. Emery
*Attorney, Agent, or Firm*—Pierce, Scheffler & Parker

[57] ABSTRACT

A process for the gettering of semi-conductors wherein the semi-conductors are placed between and in contact with solid bodies selected from the group consisting of quartz glass, silicon nitride and boron nitride which are then heated to a gettering temperature preferably between 1,000°C and 1,200°C. The heating is preferably carried out under a vacuum or in the presence of an inert atmosphere. When boron nitride is used for the solid bodies, the process can serve simultaneously for also producing the desired doping characteristic within the semi-conductor.

3 Claims, 2 Drawing Figures

PATENTED DEC 24 1974　　　　　　　　　3,856,472

APPARATUS FOR THE GETTERING OF SEMICONDUCTORS

The present invention relates to a process for the gettering of semi-conductors as well as to an apparatus for carrying out this process in practice.

When desired impurities are diffused within silicon for the purpose of producing biased semi-conductor components, undesired impurities, especially copper, gold and elements of the Fe-Ni group, will likewise diffuse into the silicon to a greater or lesser degree, depending on the experimental conditions. Such impurities will then lead, in interaction with each other and with structural defects, to the formation of adhesion and recombination centers. They can also cause the formation of donors and acceptors. All these occurrences will effect in more or less uncontrolled manner the electric functions of the semi-conductor component, and will cause a variation in the current-voltage characteristics.

Many attempts have been made by use of gettering to prevent or reverse the diffusing-in of impurities. An important role in the case of silicon is played by molten phosphorus and borosilicate materials which are applied at the surface as a getter-effective layer, whereby the gettering effect is derived indirectly from the change in the current-voltage characteristics of the semi-conductor components. (For example: J.Appl. Phys. 31 1821 (1960) or Pergamon Press 1968, Vol. 11, pages 1055 to 1061).

All known gettering processes have one decisive disadvantage: the glasses which are produced by the gettering process possess coefficients of expansion which deviate greatly from the expansion coefficient of the silicon. As a result thereof there arise during the cooling-off period strong mechanical tensional stresses within the silicon which can lead to faults in the crystal lattice and of latent cracks. The greater the size of the silicon disks, the more severe will these effects become.

It is thus a principal object of the invention to establish a process for the gettering of semiconductors, especially silicon, which avoids the disadvantages of the processes of record. Another object of the invention is the creation of an apparatus which will carry out in practice the proposed process in a suitable manner.

The process which is proposed by the invention as a solution of the problem discussed above has the characteristics that the semi-conductor is brought to a temperature between 800°C and 1,300°C, preferably between 1,000°C and 1,200°C, together with a solid body in close contact with said semi-conductor, a body which within the gettering temperature range will not enter into any chemical or other union with the semi-conductor material, and which has a solubility that is higher than the concentration of the impurities to be gettered.

In order to getter the most common impurities, such as copper, gold and the elements of the Fe-Ni group, the invention proposes the use of solid bodies, for example in the form of disks or slabs, consisting of quartz ($SiO_2$), silicon nitride or boron nitride. Such bodies are solid within the getterng temperature range and will not enter into any union with the semi-conductor material.

The invention is explained in detail below by means of examples which are illustrated in the accompanying drawings wherein.

Figure 1:
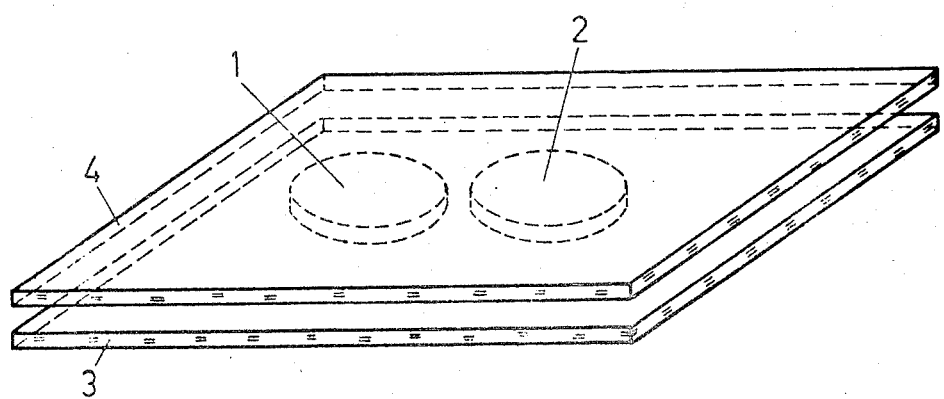
FIG. 1 shows a first species of an apparatus to getter semi-conductors.

FIG. 1 shows two semi-conductor disks 1, 2 which are arranged between two quartz glass slabs 3, 4. The semi-conductor disks consist, for example, of silicon and are already fully diffused, in other words, they are provided with the desired number of pn-junctions and possess the desired doping profile. Since the semi-conductor disks usually have plane-parallel frontal areas and are of identical thickness, the use of flat quartz glass slabs will be satisfactory.

This assembly is now placed in a furnace, for example a diffusion furnace which is standard laboratory equipment and not illustrated here, and brought to a temperature between 1,000°C and 1,200°C. The gettering temperature should be lower than the diffusion temperature so that the setting of the doping profile will not be affected or altered. Also, the gettering temperature should be lower than the melting point of the quartz glass.

Upon conclusion of the usual time of treatment (approximately 24 hours) the assembly is removed from the furnace and cooled off in routine manner.

During the thermal treatment the (above discussed) undesired impurities will diffuse from the silicon into the quartz glass. This diffusion is due to the fact that the solubility of the quartz glass with respect to so-called fast diffusants exceeds the solubility of the silicon. In addition to quartz, the compounds silicon nitride and boron nitride possess the same advantageous properties. For reasons of economy, however, the use of quartz is to be preferred because silicon nitride is considerably more expensive than quartz.

If quartz or silicon nitride are employed, there is no need to evacuate the furnace or to carry out the gettering in an ampulla under an inert atmosphere, in contrast to boron nitride. The latter compound will vitrify in the presence of water vapor so that the gettering in this case must be accomplished under vacuum or inert gas. Boron nitride has another, although only apparent, disadvantage: boron can be readily used as a doping agent. When boron nitride is heated to reach gettering temperature, boron will separate, diffuse into the silicon and alter the doping or doping profile which are present there. However, the boron diffusion during the gettering operation can be utilized for certain fields of application for the purpose of producing specific doping concentrations or doping profiles. Thus it becomes feasible to combine the final diffusion stage and the gettering into one single processing step, thereby accomplishing a significant reduction in the total treatment time for the semi-conductor component.

Figure 2:
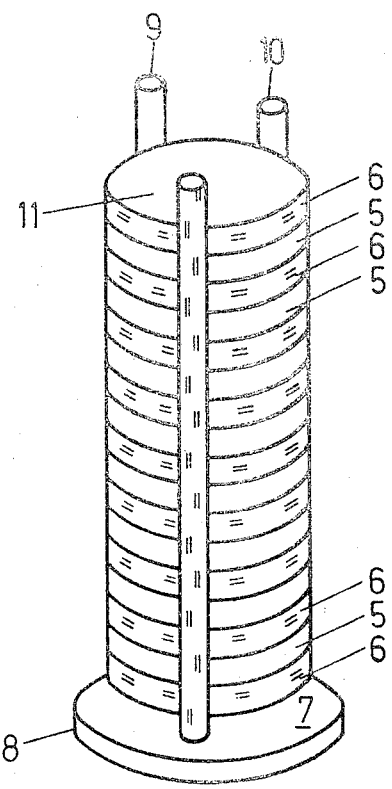
FIG. 2 depicts a second, preferred species of an apparatus to getter semi-conductors.

While the species shown by FIG. 1 represents a basic form of a gettering apparatus which is not very suitable for industrial use due to its poor utilization of space, the species depicted by FIG. 2 is arranged in such manner that this disadvantage is avoided. A stack formed alternately by semi-conductor disks 5 and quartz glass disks 6, having identical diameters, is carried within a tripod 7. The tripod comprises a base plate 8 and three upstanding parallel legs 9, 10, 11, and is also made from quartz glass. The thickness of the quartz glass disks ranges from 0.2 to 0.5 mm, the preferred size being 0.3 mm. This value represents an advantageous compromise between space utilization and useful life of the disks 6 because the latter will eventually become exhausted.

Disks 6 can also be made of silicon nitride or boron nitride in place of quartz glass but the above made reservation will apply here.

Additionally conducted tests have shown that the gettering effect of the abovementioned compounds can be increased still further if the surfaces of the slabs or disks facing the semi-conductor possess a certain surface roughness. It was found to be particularly advantageous to shape said surfaces in such manner that their depth of roughness will range between 1 and 15 $\mu$m, preferably between 3 and 7 $\mu$m, and that the two surfaces in contact with each other are sufficiently flush so that the mutual deviations of the averaged surface from a geometric plane are not greater than the depth of roughness. These conditions are met, for example, by quartz glass disks which are prepared in the usual manner by the sawing-off of quartz glass rods.

The process for the gettering of semi-conductors, as proposed by the invention, is superior to all processes of record so far as simplicity and effectiveness are concerned. Mechanical tensions within the semi-conductor are reduced to a minimum, a feature which is of the greatest importance, and in particular in case of semi-conductor disks with diameters of 50 millimeter and above.

We claim:

1. A semi-conductor gettering assembly comprising a stack of semi-conductor discs separated from each other by discs of the same size interposed respectively therebetween made from a getter material and which lie in contact with the faces of said semi-conductor discs, said getter material being selected from the group consisting of quartz glass, silicon nitride and boron nitride, and a structure made of the same material as said getter discs supporting said stacked discs comprising a base plate and at least three upstanding rods thereon distributed about a vertical axis which surround and engage the periphery of the discs.

2. A semi-conductor gettering assembly as defined in claim 1 wherein said discs made from the getter material have a thickness of between 0.1 and 1.0 mm, preferably between 0.3 and 0.7 mm.

3. A semi-conductor gettering assembly as defined in claim 2 wherein the opposite faces of said discs made from the getter material have a roughness factor varying between 1 $\mu$m and 15 $\mu$m, preferably between 3 $\mu$m and 7 $\mu$m.

* * * * *

UNITED STATES PATENT OFFICE
CERTIFICATE OF CORRECTION

Patent No. 3,856,472     Dated December 24, 1974

Inventor(s) Samuel Schweitzer and Georg Ziffermayer

It is certified that error appears in the above-identified patent and that said Letters Patent are hereby corrected as shown below:

[73] Assignee: BBC BROWN BOVERI & COMPANY LIMITED

Signed and sealed this 18th day of February 1975.

(SEAL)
Attest:

RUTH C. MASON
Attesting Officer

C. MARSHALL DANN
Commissioner of Patents
and Trademarks